H. COLL.

WATER-EJECTOR.

No. 6,759. Reissued Nov. 23, 1875.

WITNESSES.

R. A. Wanshuer

James L. Ray

INVENTOR.

Hugh Coll by Bakewell & Kerr his attorneys

N. PETERS, PHOTO-LITHOGRAPHER, WASHINGTON, D. C.

BEST AVAILABLE COPY

UNITED STATES PATENT OFFICE.

HUGH COLL, OF MILLVALE, PENNSYLVANIA.

IMPROVEMENT IN WATER-EJECTORS.

Specification forming part of Letters Patent No. 143,884, dated October 21, 1873; reissue No. 6,759, dated November 23, 1875; application filed May 21, 1875.

*To all whom it may concern:*

Be it known that I, HUGH COLL, of Millvale borough, in the county of Allegheny and State of Pennsylvania, have invented a new and useful Improvement in Water-Ejectors; and I do hereby declare the following to be a full, clear, and exact description thereof, reference being had to the accompanying drawing forming a part of this specification, in which—

Figure 1:
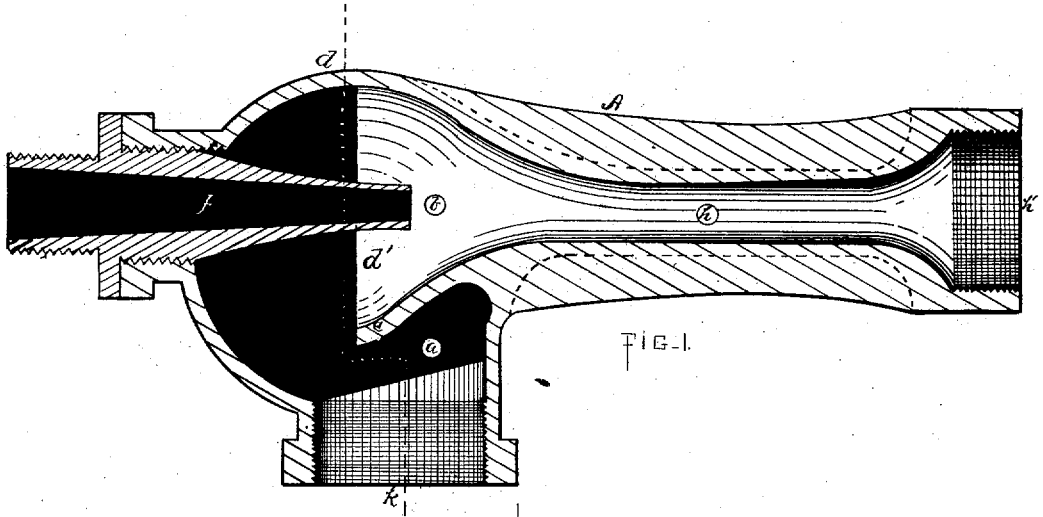
Figure 2:
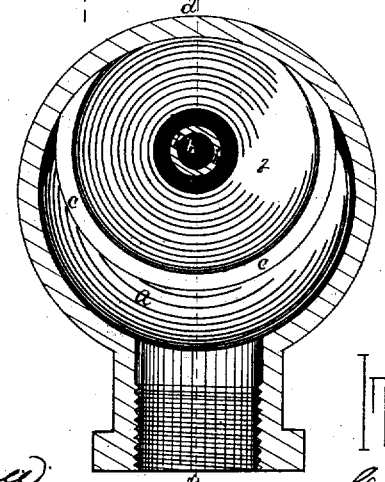

Figure 1 is a longitudinal section, and Fig. 2 is a cross-section, of my improved siphon-pump.

My invention consists in forming a diaphragm inside of the head or chamber of water-ejectors, extending partially across the chamber, over or above the supply or induction opening, for the purpose of deflecting the water as it enters the head, to prevent it from striking the power-jet directly, and to cause it to enter the discharge-chamber in a line convergent to the direction of the power-jet. This diaphragm is cast with the head, and thereby a great saving in the time and labor of construction and in amount of material used in the double-head pump is effected; and an ejector is produced which is both perfect in operation and simple in form and construction.

My invention also consists in giving the diaphragm the form which is most conducive to the perfect operation of the pump—that is, I cast it in connection with the upper portion of the head or chamber, so as to form a circular chamber which gradually tapers forward of the jet-pipe down into a discharge-nozzle. By this means I secure perfect curves and reduce the friction to a minimum.

To enable others skilled in the art to make and use my invention, I will describe its construction more fully.

The shell or head *d* is cast with a diaphragm or partition, *c*, which extends partially across the chamber *d'*, above the induction or water opening *k*, and divides the chamber, forming a lower portion, *a*, into which the water first enters, and an upper portion, *b*, from which it is discharged. To reduce the friction to a minimum, I make the discharge-chamber *b* perfectly symmetrical, reducing it by regular tapering curves down to a discharge-nozzle, *h*. The head is provided with an injection or jet pipe, *f*, which enters the rear end in the ordinary way. The sockets at *k* and *h'* being threaded, my ejector A is complete. The diaphragm *c* deflects the water entering at *k* and prevents it striking the jet directly, causing the two currents to flow together by convergent lines.

It is evident that casting the diaphragm with the shell causes little or no additional labor or cost over the old T-head pump, while its presence secures all the advantages of all the more recent improvements.

The diaphragm is cast solid to the forward portion of the shell, so that there is no opening or exit for the water at that point, the entire volume passing around the rear end of the diaphragm.

What I claim as my invention, and desire to secure by Letters Patent, is—

1. A water-ejector, having an inside diaphragm, cast in one piece therewith, which extends back from the front end of the head, partially across the lower portion of the chamber, forming a solid wall, without opening or communication between the two portions of said chamber at that point, as described.

2. The shell *d*, having a diaphragm, *c*, which, with the upper portion of the shell, forms a circular discharge-chamber, tapering, forward of the jet-pipe, down into a discharge-nozzle, substantially as described.

In witness whereof I, the said HUGH COLL, have hereunto set my hand.

HUGH COLL.

Witnesses:
JAMES I. KAY,
T. B. KERR.